(12) United States Patent
Williams

(10) Patent No.: US 6,355,133 B1
(45) Date of Patent: Mar. 12, 2002

(54) FORMING REINFORCING COMPONENTS

(75) Inventor: Stephen Williams, Bristol (GB)

(73) Assignee: BAE Systems plc, Hamsphire (GB)

( * ) Notice: Subject to any disclaimer, the term of this patent is extended or adjusted under 35 U.S.C. 154(b) by 0 days.

(21) Appl. No.: 09/465,940

(22) Filed: Dec. 17, 1999

(30) Foreign Application Priority Data

Dec. 22, 1998 (GB) ............................................. 9828368

(51) Int. Cl.$^7$ ........................... B32B 31/00; B65H 81/00
(52) U.S. Cl. ...................... 156/296; 156/166; 156/285; 156/286; 264/257; 264/258
(58) Field of Search ................. 156/382, 285, 156/286, 166, 296; 264/257, 258

(56) References Cited

U.S. PATENT DOCUMENTS

| | | | |
|---|---|---|---|
| 5,145,621 A | * 9/1992 | Pratt | ....................... 156/382 X |
| H1162 H | 4/1993 | Yamamoto et al. | |
| 5,286,438 A | * 2/1994 | Dublinski et al. | ....... 264/258 X |
| 5,648,109 A | * 7/1997 | Gutowski et al. | ............ 156/382 |

FOREIGN PATENT DOCUMENTS

| EP | 0 319 449 | 12/1988 |
|---|---|---|
| EP | 0 860 268 | 8/1998 |
| WO | WO 98/50214 | 11/1998 |

OTHER PUBLICATIONS

T. Gutowski, et al, "Differential Geometry and the Forming of Aligned Fibre Composites" *Composites Manufacturing* vol. 2, No. 3 / 4, 1991.

* cited by examiner

*Primary Examiner*—Jeff H. Aftergut
(74) *Attorney, Agent, or Firm*—Nixon & Vanderhye P.C.

(57) ABSTRACT

A method of forming a substantially planar, multi-layer, composite article that comprises a plastics materials reinforced with fibers that extend substantially continuously in one direction in the plane of each layer is provided. The majority of the layers are aligned in a main direction B and the article (20*a*) is disposed over a contoured surface of a forming tool (6). The article (20*a*) is constrained against movement in a direction perpendicular to the plane of the main direction layers and forces applied to the article (20*a*) in the plain thereof in a direction substantially perpendicular to the main direction of the fibers. The article (20*a*) is thereby urged into conformity with the contoured surface of the tool (6) while substantially maintaining the continuity of the fibers.

14 Claims, 3 Drawing Sheets

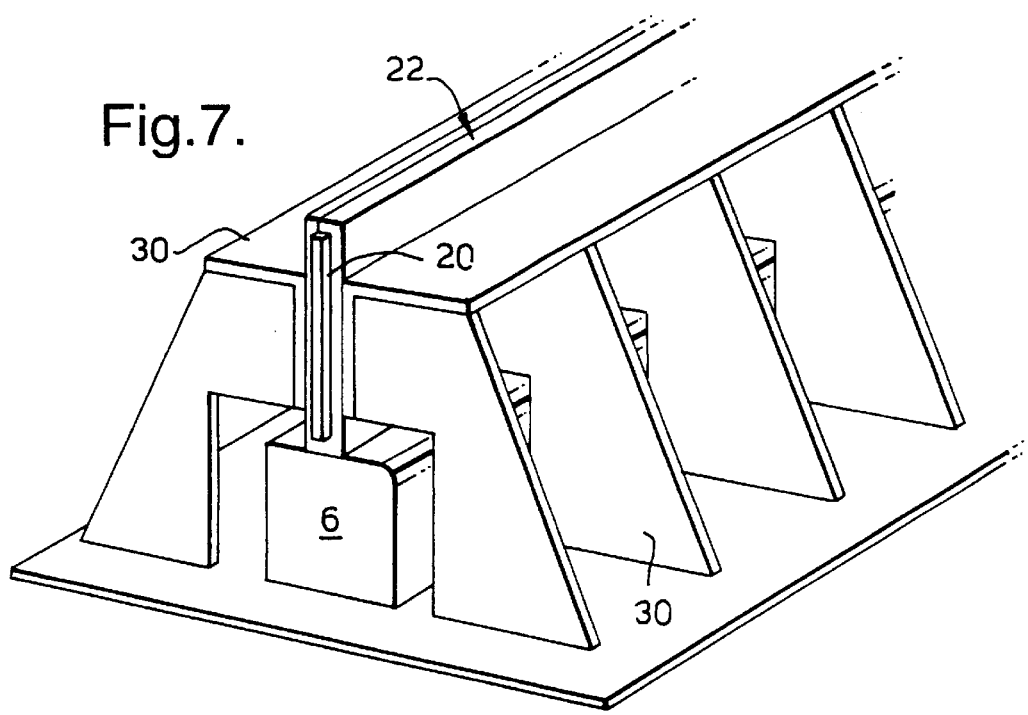
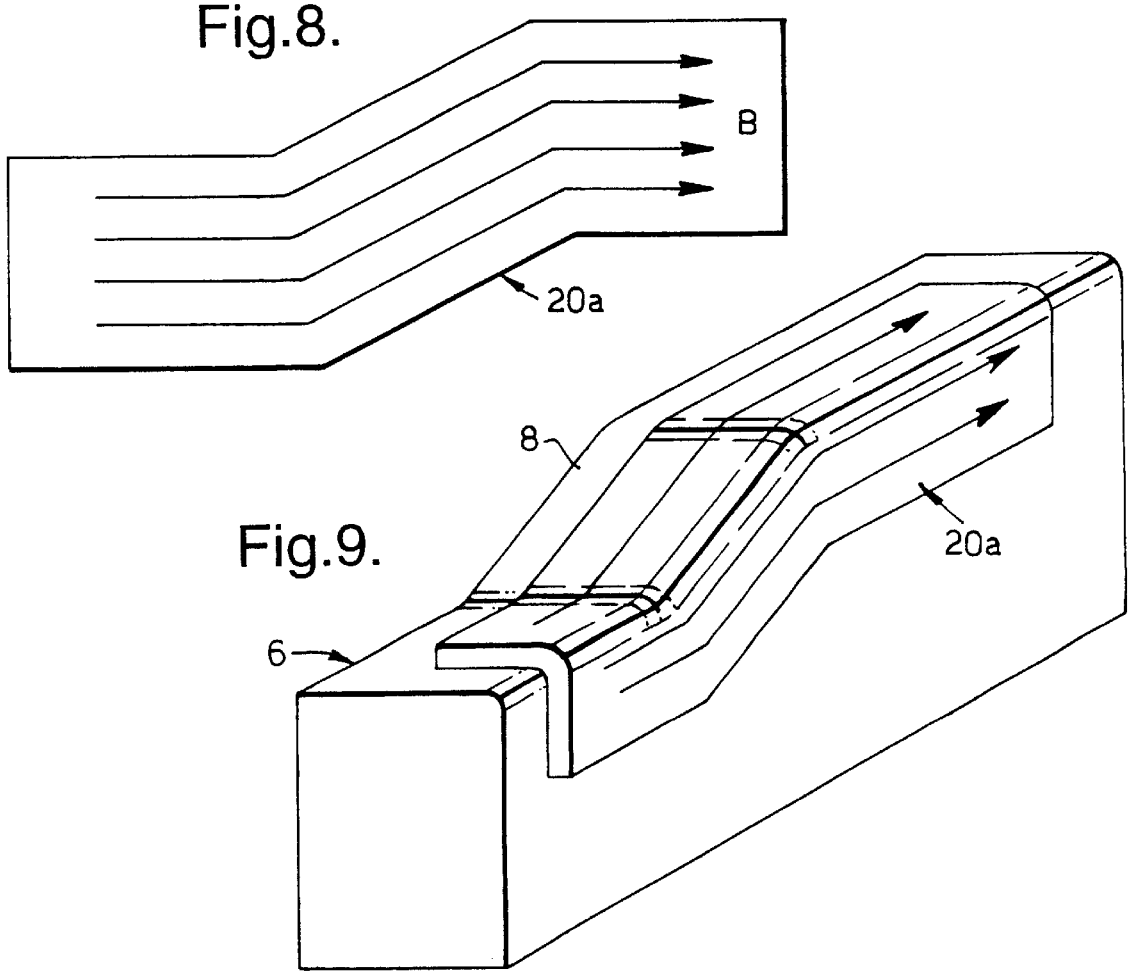

FORMING REINFORCING COMPONENTS

BACKGROUND TO THE INVENTION

This invention relates to forming reinforcing components, and in particular to forming a composite fibre reinforced plastics article to conform with a contoured surface.

Articles formed in accordance with the present invention have a variety of applications, but by way of example only, and without limitation to the generality, reference will be made to the forming of reinforcing components used in the aircraft industry, for example aircraft stringer sections.

When forming such components, in order to maximise their structural effect, it is desirable to ensure that the fibres of the component follow the contours thereof as closely as possible. Such a component may be produced by manually laminating a succession of prepreg plies so as to form a multi-layered stack, but this is very time consuming. "Prepreg" material consists of one or more plies of Jibson's reinforcing material pre-impregnated with uncured resin or like matrix material.

1. Description of the Prior Art

It is known to form a thick stack of uncured prepreg material to provide reinforcement in one direction. As can be seen from FIG. 1 of the accompanying drawings, a flat sheet 2 of uncured prepreg having a large plurality of carbon fibres embedded in epoxy resin, with the fibres aligned in the direction of the arrow A, has been formed into a 90° bend over the edge of a forming tool 4. In this way, an L-shaped stiffener is made, and it can be envisaged that with a larger sheet of prepreg two bends could be made so as to provide a channel section, with the fibres thereof extending undirectionally. Such a method of forming a component, however, has the disadvantage that it cannot be utilized when the surface to which the article has to conform is contoured, for example containing a joggle or a ramp, or being undulating. Such geometric features introduce diversions into the path of the fibres, which, instead of following the contour, flow around the bend radius (see FIG. 2), and are thus no longer properly aligned in the required load-bearing direction. The reinforcing effect is thus not so efficient.

Alternatively, cutting a shaped blank such that it achieves good conformity to the underlying contoured surface results in load bearing fibres being cut. FIG. 2 of the accompanying drawings shows a forming tool 6 that is a modification of the tool 4 of FIG. 1, in that its upper surface is provided with a ramp 8. FIG. 3 shows a rectangular blank 10 that has been subjected to two cuts along trimlines 12 and 14 so as to achieve the conformity not only with the 90° bend but also along the ramp 8 of FIG. 2.

2. Summary of the Invention

It is one object of the present invention to provide an improved forming method.

In accordance with one aspect of the present invention there is provided a method of forming a substantially planar, multi-layer, composite article that comprises a plastics material reinforced with fibres that extend substantially continuously in one direction in the plane of each layer, wherein a majority of the layers are aligned in a main direction, wherein the article is disposed over a contoured surface of a forming tool, wherein the article is constrained against movement in a direction substantially perpendicular to the plane of said main direction layers, wherein force is applied to the article in the plane thereof in a direction substantially perpendicular to the said main direction of said fibres, thereby to urge the article into conformity with the contoured surface of the tool whilst substantially maintaining the continuity of the said fibres.

Depending on the viscosity of the resin of the composite article, heat may need to be applied thereto in order to ensure that the layers, or laminates, are able to slide with respect to each other. Typically, although the fibres within each layer will be substantially unidirectionally aligned, not all the layers will be aligned. The actual alignment of the plurality of layers will depend on the structural load requirements, of tension and torsion for example. Normally a majority of the fibres, and of the layers are aligned in one main direction for reinforcement, referred to as the 0° direction. Various other layers may then be aligned at 45°, 190°, and 135° thereto as required. For example, 50% of the layers/fibres may be in the 0° main direction, with 20% each at 45° and 135°, and 10% at 90°.

The invention thus results in a composite article that is contoured, for example to conform with the shaping of a joggle or ramp, without any of the fibres in the said load-bearing direction being cut. The contouring has been effected by applying a force to the planar article whilst simultaneously preventing any buckling thereof.

Preferably, the article is constrained by being loaded into a support that allows flexibility in a direction to achieve the required contouring but which is rigid in a direction perpendicular thereto. Advantageously, the support may comprise an elastomeric material reinforced with spaced apart rigid rods, of aluminium or steel for example.

The support is preferably mounted in a rigid frame that is located around the forming tool and that is arranged to guide the article in a direction towards the contoured surface during the forming process.

The force may be provided by a press acting on an edge of the planar article. Alternatively, the article, tool, frame and support may be located in an enclosure that is then evacuated.

The contoured, planar reinforcing article thus produced, may be subjected to a further forming operation in which heat is again applied thereto and a force is applied to effect further forming thereof. For example the further forming operation may be arranged to produce a fold about a line in the planar surface of the article, the line preferably extending substantially parallel to the direction of the said fibres, thus producing an L-shaped article. A further forming operation may be arranged to produce a channel-shaped article, or one of any desired shape.

Thus, the present invention provides a method of forming a substantially planar, multi-layer composite article such that it is able to conform to a substrate that comprises three contiguous surfaces each of which is angled, i.e. lies at other than 0°, to the other two surfaces. The surfaces may be generally planar, but may for example, be convoluted and may comprise a ramp or a joggle.

The plastics material of the article may be thermoplastics. Alternatively, the plastics material may be curable, for example being a thermoset, with curing being effected after the forming thereof has been completed.

The reinforcing fibres may be of carbon, aramid or glass, for example.

It is to be understood that although reference has been made to directions with respect to the orientation of continuous fibres in the plane of the article, the composite article may include fibres in layers at various other angles to this primary load-bearing direction.

The method of the present invention finds particular application to a multi-layer composite article, due to its increased rigidity with respect to a relatively flexible single ply article. Thus, the article to which the present invention is particularly beneficial is envisaged as comprising at least two plies, each of which would typically be between 0.125 and 0.25 mm thick, and typically would have a minimum of 8 plies, thus giving a thickness of 2 to 3 mm, and may even be formed as a 5 mm thick stack of 20 plies, or more. It will be appreciated that the number of plies, and thus the thickness of the article would depend on the loading to which it was to be subject in use.

In accordance with a further aspect of the present invention, there is provided apparatus for forming a substantially planar, multi-layer composite article, comprising means for constraining the article in a direction substantially perpendicular to its plane, means for mounting the article over a contoured surface to which it is to be conformed, and means for applying a force in a direction in the plane of the article to urge the article into conformity with the contoured surface.

The apparatus is preferably arranged to carry out the features of the method of the invention.

BRIEF DESCRIPTION OF THE DRAWINGS

A method of forming a multi-layer, composite article, in accordance with the present invention, will now be described, by way of example, with reference to the accompanying drawings, in which:

FIG. 7 is a perspective view corresponding to FIG. 6;

FIG. 8 is a plan view of the preform subsequent to a first forming operation; and FIG. 9 is a perspective view of the finished article on a forming tool after undergoing a further forming operation.

DESCRIPTION OF THE PREFERRED EMBODIMENT

Figure 1:
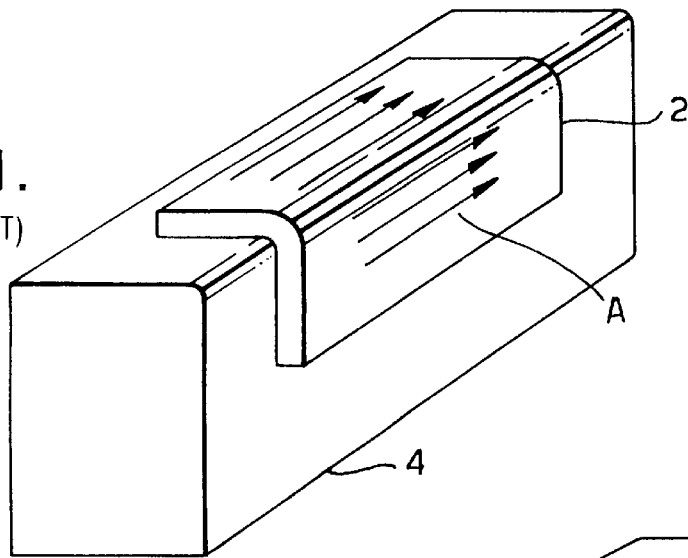
FIG. 1 is a perspective view of a prior art layer of pre-preg on a forming tool.
Figure 2:
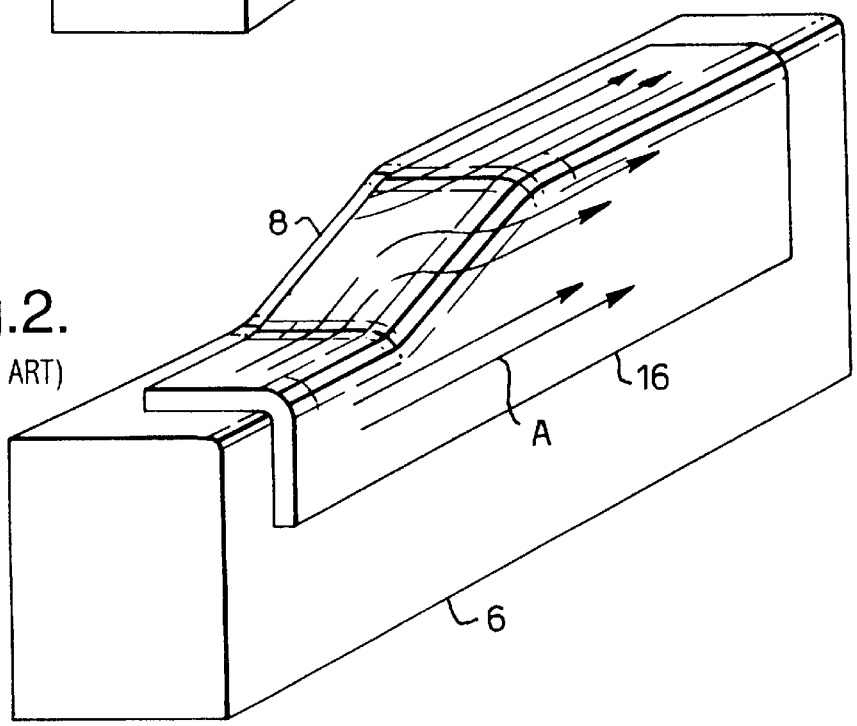
FIG. 2 is a perspective view of a prior art layer of pre-preg on a contoured surface of a forming tool.
Figure 3:
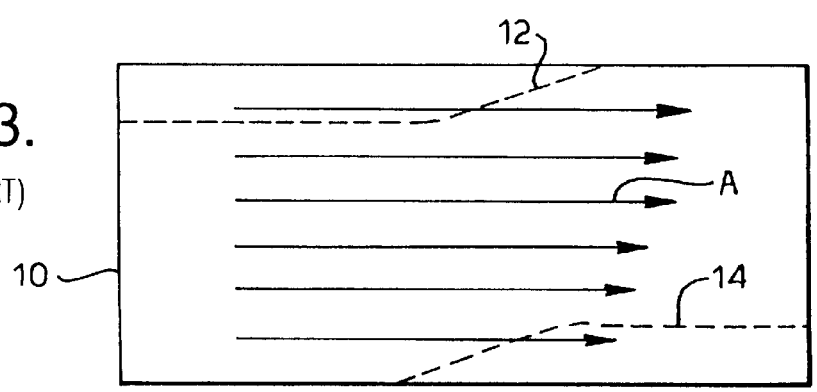
FIG. 3 is a plan view of a prior art pre-preg cut to fit the tool of FIG. 2.
Figure 4:
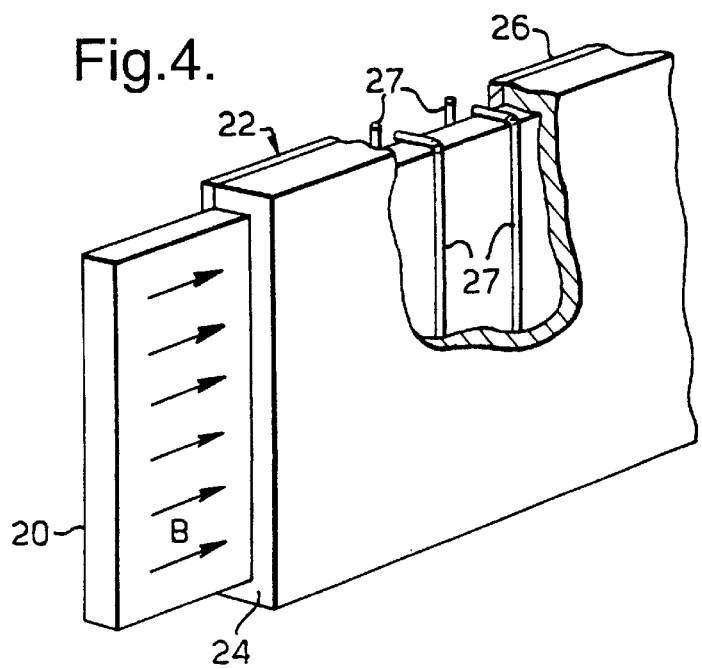
FIG. 4 is a partially cut-away perspective view of a flexible support with a preform blank of the article partially inserted thereinto.
Figure 5:
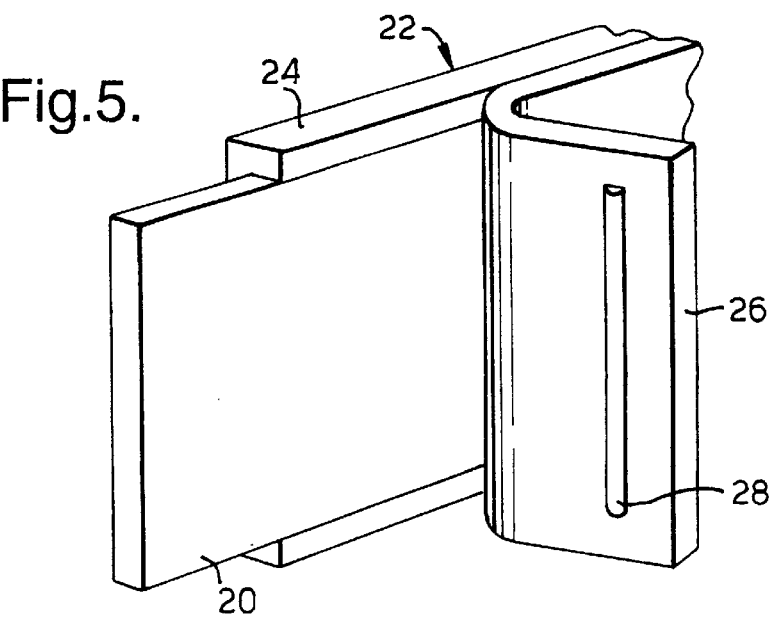
FIG. 5 is a view of one end of the support of FIG. 4 prior to its closure.

Referring to FIGS. 4 and 5, a multi-layer preform blank 20 comprises a rectangular planar body of epoxy resin containing carbon fibres in which a majority of the layers and fibres extend along the direction B continuously from one end to the other thereof. The blank 20 is shown being introduced into a flexible support 22 that is formed of rubber and has stainless steel stiffening rods 27 embedded therein. The support 22 is in two parts, comprising a three-sided channel section 24 and a removable cover 26, each of which has correspondingly-shaped rods 27 embedded therein. Additionally, as can be seen in FIG. 5, the cover 26 has, at each end thereof, a protrusion 28 that is arranged to clamp the blank 20 at its end when it is loaded completely into the channel section 24 of the support 22.

Figure 6:
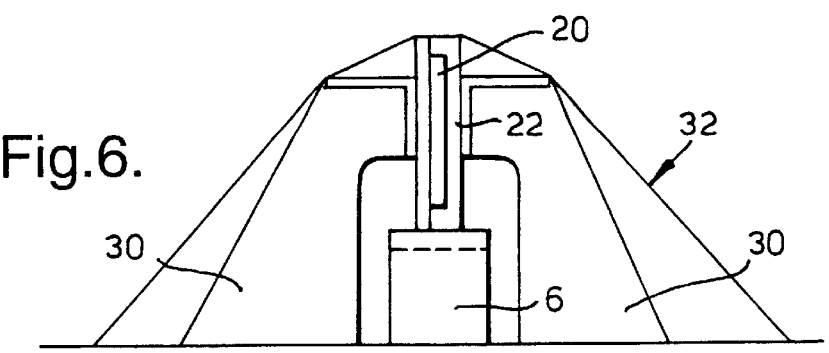
FIG. 6 is an end view of the supported article of FIG. 4 retained within a rigid frame, mounted on a forming tool and enclosed within a vacuum bag.

Referring to FIGS. 6 and 7, the preform blank 20, mounted in the flexible support 22 is clamped along its length and over an intermediate portion only of its height between two rigid aluminium frame members 30. The frame members 30 position the supported blank 20 over the upper contoured surface of the form tool 6. The frames 30 act together with the stiffeners 27 of the support 22 to prevent any substantial deformation of the blank 20 in a direction perpendicular to the vertical plane thereof, whilst allowing the reinforced support 22 containing the blank 20 to be guided in the vertical plane. The blank 20, support 22 and frames 30, are enclosed within a vacuum bag 32 (FIG. 6).

In operation, the air within the bag 32 is pumped out, thereby exerting a vertically-downward load on the exposed upper portion of the blank 20 within the support 22. At the same time, heat is applied to soften the curable material of the blank 20, the exposed lower portion of which consequently, and together with the support 22, is forced into conformity with the upper ramped contour of the form tool 6. The vacuum is maintained within the bag 32 whilst the blank 20 is allowed to cool and thus to solidify into its conformed shape. The resultant planar component 20a, after removal from the deformed support 22, is shown in FIG. 8. As can be seen from FIG. 8, the component 20a is shaped to configure to the ramp 8 with the unidirectional fibres extending continuously in the direction B.

FIG. 9 shows a further forming step that may be carried out on the component 20a, whereby its planar surface is formed into a right angle, whilst still conforming to the ramp 8 of the form tool 6. This operation is carried out whilst applying increased heating to the component 20a, whilst still subject to a vacuum or other deforming force, whereby it is softened to allow the 90° angle to be formed therein, and its subjected to such a temperature that the epoxy material thereof is cured. Alternatively, curing may be carried out during a subsequent operation, for example when the main skin component, with which the article is associated, is itself cured.

The resulting article thus extends in three planes that are angled to each other, and the continuity of the unidirectional, load-bearing fibres is maintained.

It will be appreciated that by suitable choice of the form tool, the initial preform blank can be formed into any required configuration so as during the initial forming step to conform to a ramp, joggle or other disturbance from a plane, whilst maintaining continuity of the fibres in the required load-bearing direction. Further forming may then take place to provide, for example, an L or C-shaped sectioned member. The resulting component can then be removed from the form tool and applied as reinforcement to the required structural member, for example an aircraft stringer section.

What is claim is:

1. A method of forming a substantially planar, multi-layer, composite article that comprises a plastics material reinforced with fibres that extend substantially continuously in one direction in the plane of each layer, wherein a majority of the layers are aligned in said one direction, said method comprising the steps of:

disposing said article over a contoured surface of a forming tool, constraining said article against movement in a direction substantially perpendicular to the plane of said one direction layers, applying force to the article in the plane thereof, in a direction substantially perpendicular to the said one direction of said fibres, and towards said contoured surface of said forming tool thereby urging the article into conformity with the contoured surface of the tool whilst substantially maintaining the continuity of the said fibres.

2. A method according to claim 1, wherein the constraining of the article is carried out by mounting the article in a flexible support that is reinforced in, or parallel to, the plane of said one direction of the article.

3. A method according to claim 2 wherein the support comprises an elastomeric material reinforced with spaced-apart rigid rods.

4. A method according to claim 2 wherein the support is in the form of a container that receives the planar article.

5. A method according to claim 2 wherein the support is mounted in a rigid frame located around the forming tool and is arranged to guide the article in a direction towards the contoured surface of the forming tool under the action of the said force.

6. A method according to claim 2 wherein the reinforcement is arranged substantially to prevent movement of the article in the said one direction of the said fibres.

7. A method according to claim 1 wherein the force acting on the article is produced by means of a press or a vacuum.

8. A method according to claim 1 wherein subsequent to the said conforming operation, a further forming operation is carried out whereby the article is heated and force is applied thereto such that it is folded about a line in its planar surface that extends substantially parallel to the said one direction of the said fibres.

9. A method according to claim 8 wherein the plastics material comprises a thermoset plastic, and wherein sufficient heat is applied only during the further forming operation to effect curing thereof.

10. A method according to claim 1 wherein the plastics material of the article is curable and is cured after the forming thereof has been completed.

11. A method according to claim 1, wherein the article comprises a carbon- or glass-fibre reinforced plastics material, and is formed as a structural reinforcing member with the said fibres in the one direction aligned in a main load-bearing direction thereof.

12. A method according to claim 1 wherein the contouring of the forming tool is arranged to allow the formed article to conform to a joggle or a ramp.

13. A method according to claim 1 wherein the article is softened by the application of heat prior to applying said force thereto.

14. A method of forming a substantially planar, multi-layer, composite article that comprises a plastics material reinforced with fibres that extend substantially continuously in one direction in the plane of each layer, wherein a majority of the layers are aligned in a main direction, wherein the article is disposed over a contoured surface of a forming tool, wherein the article is constrained against movement in a direction substantially perpendicular to the plane of said main direction layers, wherein force is applied to the article in the plane thereof in a direction substantially perpendicular to the said main direction of said fibres, thereby to urge the article into conformity with the contoured surface of the tool whilst substantially maintaining the continuity of the said fibres, wherein the constraining of the article is carried out by mounting the article in a flexible support that is reinforced in, or parallel to, the plane of said main direction of the article, wherein the support is mounted in a rigid frame located around the forming tool and is arranged to guide the article in a direction towards the contoured surface of the forming tool under the action of the said force.

* * * * *